US009253708B2

(12) United States Patent
Takahashi et al.

(10) Patent No.: US 9,253,708 B2
(45) Date of Patent: Feb. 2, 2016

(54) MOBILE COMMUNICATION METHOD, RELAY NODE, AND WIRELESS BASE STATION

(75) Inventors: Hideaki Takahashi, Tokyo (JP); Wuri Andarmawanti Hapsari, Tokyo (JP); Mikio Iwamura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 122 days.

(21) Appl. No.: 14/122,861

(22) PCT Filed: May 29, 2012

(86) PCT No.: PCT/JP2012/063718
§ 371 (c)(1),
(2), (4) Date: Nov. 27, 2013

(87) PCT Pub. No.: WO2012/165411
PCT Pub. Date: Dec. 6, 2012

(65) Prior Publication Data
US 2014/0112240 A1    Apr. 24, 2014

(30) Foreign Application Priority Data
May 31, 2011    (JP) .................................. 2011-122199

(51) Int. Cl.
*H04W 80/04*    (2009.01)
*H04W 84/12*    (2009.01)
(Continued)

(52) U.S. Cl.
CPC .......... *H04W 40/36* (2013.01); *H04W 36/0055* (2013.01); *H04W 36/08* (2013.01); *H04W 84/047* (2013.01)

(58) Field of Classification Search
CPC ..... H04W 88/04; H04W 80/04; H04W 36/18; H04W 36/14; H04W 84/12
See application file for complete search history.

(56) References Cited

U.S. PATENT DOCUMENTS

2010/0103845 A1    4/2010  Ulupinar et al.
2011/0080890 A1*   4/2011  Cai et al. ...................... 370/331
(Continued)

FOREIGN PATENT DOCUMENTS

JP    2011035783 A    2/2011
WO    2011019972 A1   2/2011
(Continued)

OTHER PUBLICATIONS

3GPP TS 36.300 V8.8.0, (Mar. 2009), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)," (158 pages).

(Continued)

*Primary Examiner* — Andrew Lee
(74) *Attorney, Agent, or Firm* — Osha Liang LLP

(57) ABSTRACT

To reduce interference to an own receiver of a relay node due to concurrent transmission/reception processing in a Un radio bearer and in a Uu radio bearer when the relay node RN is handed over from a radio base station DeNB#1 to a radio base station DeNB#2. A mobile communication method includes a process A, in the handover procedure, of notifying the radio base station DeNB#2, by the relay node RN, of "Un subframe pattern #1" indicating a pattern of a Un subframe #1 and "RN subframe config req" indicating whether it is necessary to set a Un subframe #2 in a radio bearer #2 between the radio base station DeNB#2 and the relay node RN.

6 Claims, 9 Drawing Sheets

(51) Int. Cl.
*H04W 40/36* (2009.01)
*H04W 36/00* (2009.01)
*H04W 36/08* (2009.01)
*H04W 84/04* (2009.01)

(56) References Cited

U.S. PATENT DOCUMENTS

| | | | |
|---|---|---|---|
| 2012/0155377 A1* | 6/2012 | Chai | 370/315 |
| 2012/0243461 A1* | 9/2012 | Bucknell et al. | 370/315 |
| 2012/0276910 A1* | 11/2012 | Zhang | 455/439 |
| 2012/0314569 A1* | 12/2012 | Liu et al. | 370/230 |
| 2012/0315913 A1* | 12/2012 | Yang et al. | 455/438 |
| 2013/0040558 A1* | 2/2013 | Kazmi | 455/9 |
| 2013/0137434 A1* | 5/2013 | Godin | 455/436 |
| 2013/0250918 A1* | 9/2013 | Liu et al. | 370/332 |
| 2013/0329628 A1* | 12/2013 | Yang | 370/315 |
| 2014/0022981 A1* | 1/2014 | Kim et al. | 370/315 |
| 2014/0301370 A1* | 10/2014 | Sivavakeesar | 370/331 |

FOREIGN PATENT DOCUMENTS

| | | | |
|---|---|---|---|
| WO | 2011019973 A2 | 2/2011 | |
| WO | 2011029524 A1 | 3/2011 | |

OTHER PUBLICATIONS

3GPP TR 36.814 V0.4.1 (Feb. 2009), "3rd Generation Partnership Project; Technical Specification Group Radio Access Network; Further Advancements for E-UTRA Physical Layer Aspects (Release 9)," (32 pages).

3GPP TS 36.331 V8.6.0 (Jun. 2009), "3rd Generation Partnership Project; Technical Specification Group Radio Access Network; Evolved Universal Terrestrial Radio Access (E-UTRA) Radio Resource Control (RRC); Protocol Specification (Release 8)," (207 pages).

3GPP TS 36.216 V10.2.0 (Mar. 2011), "3rd Generation Partnership Project; Technical Specification Group Radio Access Network; Evolved Universal Terrestrial Radio Access (E-UTRA); Physical Layer for Relaying Operation (Release 10)," (16 pages).

3GPP TS 36.300 V10.3.0 (Mar. 2011), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 10)," (197 pages).

3GPP TS 36.133 V10.2.0 (Apr. 2011), "3rd Generation Partnership Project; Technical Specification Group Radio Access Network; Evolved Universal Terrestrial Radio Access (E-UTRA); Requirements for Support of Radio Resource Management (Release 10)," (419 pages).

Office Action issued in Japanese Patent Application No. 2011-122199, mailing date Ocotber 8, 2013, with English translation thereof (4 pages).

Written Opinion of the International Searching Authority issued in PCT/JP2012/063718, mailing date Jul. 3, 2012, with English translation thereof (7 pages).

Extended European Search Report issued in corresponding European Application No. 12792525.3, mailed May 22, 2015 (11 pages).

Rapporteur (Samsung); "Miscellaneous corrections (related to review in preparation for ASN.1 freeze)"; Change Request; 3GPP TSG-RAN2 Meeting #74, R2-113530; Barcelona, Spain; May 9-13, 2011 (2 pages).

3GPP TS 36.331 V10.1.0; "3rd Generation Partnership Project; Technical Specification Group Radio Access Network; Evolved Universal Terrestrial Radio Access (E-UTRA); Radio Resource Control (RRC); Protocol specification; (Release 10)"; Mar. 2011 (291 pages).

3GPP TR 36.816 V1.3.0; "3rd Generation Partnership Project; Technical Specification Group Radio Access Networks; Evolved Universal Terrestrial Radio Access (E-UTRA; Study on signalling and procedure for interference avoidance for in-device coexistence; Technical Report; (Release 10)"; Apr. 2011 (40 pages).

* cited by examiner

FIG. 3

– *RRCConnectionReconfigurationComplete*

The *RRCConnectionReconfigurationComplete* message is used to confirm the successful completion of an RRC connection reconfiguration.

Signalling radio bearer: SRB1
RLC-SAP: AM
Logical channel: DCCH
Direction: UE to E-UTRAN

RRCConnectionReconfigurationComplete message

```
-- ASN1START

RRCConnectionReconfigurationComplete ::=   SEQUENCE {
    rrc-TransactionIdentifier           RRC-TransactionIdentifier,
    criticalExtensions                  CHOICE {
        rrcConnectionReconfigurationComplete-r8
                                        RRCConnectionReconfigurationComplete-r8-IEs,
        criticalExtensionsFuture        SEQUENCE {}
    }
}

RRCConnectionReconfigurationComplete-r8-IEs ::= SEQUENCE {
    nonCriticalExtension                RRCConnectionReconfigurationComplete-v8a0-IEs      OPTIONAL
}

RRCConnectionReconfigurationComplete-v8a0-IEs ::= SEQUENCE {
    lateNonCriticalExtension            OCTET STRING                                       OPTIONAL,
    nonCriticalExtension                RRCConnectionReconfigurationComplete-v10xy-IEs     OPTIONAL
}

RRCConnectionReconfigurationComplete-v10xy-IEs ::= SEQUENCE {
    logMeasAvailable-r10                ENUMERATED {true}                                  OPTIONAL,
    nonCriticalExtension                RRCConnectionReconfigurationComplete-v11xy-IEs
                                                                                           OPTIONAL
}

RRCConnectionReconfigurationComplete-v11xy-IEs ::= SEQUENCE {
    rn-SubframeConfigReq-r11            ENUMERATED {required, notRequired}     OPTIONAL,
    rn-SubframeConfig-r11               RN-SubframeConfig-r11                  OPTIONAL,    -- Need ON
    nonCriticalExtension                SEQUENCE {}                            OPTIONAL
}

-- ASN1STOP
```

FIG. 5

(X2) HO Request

| IE/Group Name | Presence | Range | IE type and reference | Semantics description | Criticality | Assigned Criticality |
|---|---|---|---|---|---|---|
| Message Type | M | | 9.2.13 | | YES | reject |
| Old eNB UE X2AP ID | M | | eNB UE X2AP ID 9.2.24 | Allocated at the source eNB | YES | reject |
| Cause | M | | 9.2.6 | | YES | ignore |
| Target Cell ID | M | | ECGI 9.2.14 | | YES | reject |
| GUMMEI | M | | 9.2.16 | | YES | reject |
| UE Context Information | M | 1 | | | YES | reject |
| > MME UE S1AP ID | M | | INTEGER (0..2$^{32}$−1) | MME UE S1AP ID allocated at the MME | – | – |
| > UE Security Capabilities | M | | 9.2.29 | | – | – |
| >AS Security Information | M | | 9.2.30 | | – | – |
| > UE Aggregate Maximum Bit Rate | M | | 9.2.12 | | – | – |
| > Subscriber Profile ID for RAT/Frequency priority | O | | 9.2.25 | | – | – |
| >E-RABs To Be Setup List | | 1 | | | – | – |
| >>E-RABs To Be Setup Item | | 1 to <maxnoof Bearers> | | | EACH | ignore |
| >>> E-RAB ID | M | | 9.2.23 | | – | – |
| >>> E-RAB Level QoS Parameters | M | | 9.2.9 | Includes necessary QoS parameters | – | – |
| >>> DL Forwarding | O | | 9.2.5 | | – | – |
| >>> UL GTP Tunnel Endpoint | M | | GTP Tunnel Endpoint 9.2.1 | SGW endpoint of the S1 transport bearer. For delivery of UL PDUs | – | – |
| >RRC Context | M | | OCTET STRING | Includes the RRC Handover Preparation Information message defined in subclause 10.2.2 of [9]. | – | – |
| >Handover Restriction List | O | | 9.2.3 | | – | – |
| >Location Reporting Information | O | | 9.2.21 | Includes the necessary parameters for location reporting | – | – |
| UE History Information | M | | 9.2.38 | Same definition as in [4]. | YES | ignore |
| Trace Activation | O | | 9.2.2 | | YES | ignore |
| SRVCC Operation Possible | O | | 9.2.33 | | YES | ignore |
| CSG Status | O | | 9.2.52 | | YES | reject |
| RN Subframe status | O | | | | | |
| RN Subframe Configuration | O | | | | | |

FIG. 6

RN subframe status

| IE/Group Name | Presence | Range | IE type and reference | Semantics description |
|---|---|---|---|---|
| RN subframe status | M | | INTEGER (0..100) | Percentage of resource blocks of RN subframes allocated for UEs connected to theRN. The denominator of the percentage calculation is indicated in the RN subframe configuration. |

FIG. 7

(S1) HO Required

S1 Handover Required (source DeNB -> MME)

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| Handover Type | M | | 9.2.1.13 | | YES | reject |
| Cause | M | | 9.2.1.3 | | YES | ignore |
| Target ID | M | | 9.2.1.6 | | YES | reject |
| Direct Forwarding Path Availability | O | | 9.2.3.15 | | YES | ignore |
| SRVCC HO Indication | O | | 9.2.1.59 | | YES | reject |
| Source to Target Transparent Container | M | | 9.2.1.56 | | YES | reject |
| Source to Target Transparent Container Secondary | O | | Source to Target Transparent Container 9.2.1.56 | | YES | reject |
| MS Classmark 2 | C-ifSRVCCtoGERAN | | 9.2.1.64 | | YES | reject |
| MS Classmark 3 | C-ifSRVCCtoGERAN | | 9.2.1.65 | | YES | ignore |
| CSG Id | O | | 9.2.1.62 | | YES | reject |
| Cell Access Mode | O | | 9.2.1.74 | | YES | reject |
| PS Service Not Available | O | | 9.2.1.77 | | YES | ignore |
| RN Subframe status | O | | | | | |
| RN Subframe Configuration | O | | | | | |

FIG. 8

(S1) HO Request
S1 Handover Request (MME -> Target DeNB)

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| Handover Type | M | | 9.2.1.13 | | YES | reject |
| Cause | M | | 9.2.1.3 | | YES | ignore |
| UE Aggregate Maximum Bit Rate | M | | 9.2.1.20 | | YES | reject |
| E-RABs To Be Setup List | | 1 | | | YES | reject |
| >E-RABs To Be Setup Item IEs | | 1 to <maxnoof E-RABs> | | | EACH | reject |
| >>E-RAB ID | M | | 9.2.1.2 | | - | |
| >>Transport Layer Address | M | | 9.2.2.1 | | - | |
| >>GTP-TEID | M | | 9.2.2.2 | To deliver UL PDUs | - | |
| >>E-RAB Level QoS Parameters | M | | 9.2.1.15 | Includes necessary QoS parameters | - | |
| >>Data Forwarding Not Possible | O | | 9.2.1.76 | | YES | ignore |
| Source to Target Transparent Container | M | | 9.2.1.56 | | YES | reject |
| UE Security Capabilities | M | | 9.2.1.40 | | YES | reject |
| Handover Restriction List | O | | 9.2.1.22 | | YES | ignore |
| Trace Activation | O | | .4 | | YES | ignore |
| Request Type | O | | 9.2.1.34 | | YES | ignore |
| SRVCC Operation Possible | O | | 9.2.1.58 | | YES | ignore |
| Security Context | M | | 9.2.1.26 | | YES | reject |
| NAS Security Parameters to E-UTRAN | C-iffromUTRANGERAN | | 9.2.3.31 | The eNB shall use this IE as specified in [15]. | YES | reject |
| CSG Id | O | | 9.2.1.62 | | YES | reject |
| CSG Status | O | | 9.2.1.73 | | YES | ignore |
| GUMMEI | O | | 9.2.3.9 | This IE indicates the MME serving the UE | YES | reject |
| MME UE S1AP ID 2 | O | | 9.2.3.3 | This IE indicates the MME UE S1AP ID assigned by the MME | YES | reject |
| RN Subframe status | O | | | | | |
| RN Subframe Configuration | O | | | | | |

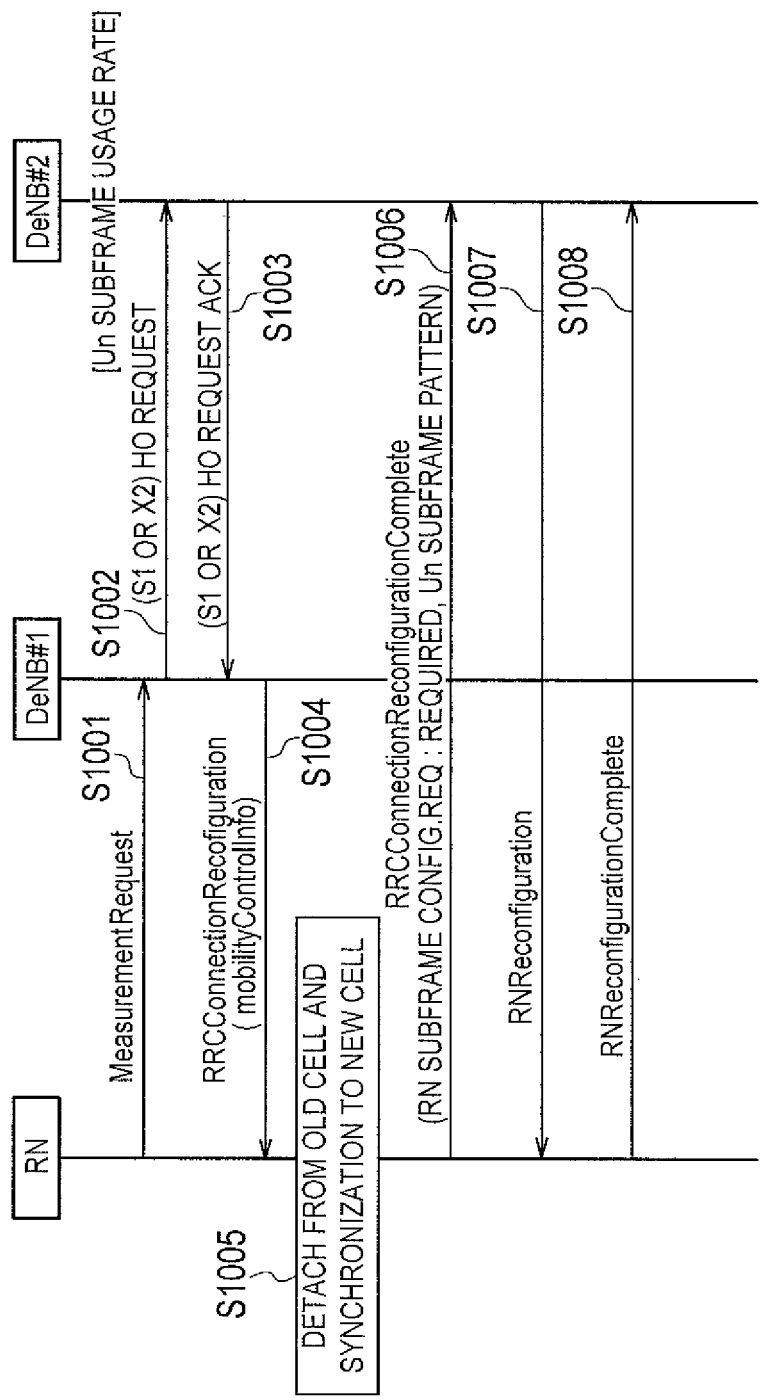

US 9,253,708 B2

MOBILE COMMUNICATION METHOD, RELAY NODE, AND WIRELESS BASE STATION

TECHNICAL FIELD

The present invention relates to a mobile communication method, a relay node, and a radio base station.

BACKGROUND ART

In a mobile communication system of an LTE-Advanced system, which is a succeeding communication system of a long term evolution (LTE) system, a "relay node RN" provided with a similar function to a radio base station DeNB (Donor eNB) can be connected between a mobile station UE and the radio base station DeNB.

Such a mobile communication system of an LTE-Advanced system is configured such that an E-UTRAN radio access bearer (E-RAB) is set between the mobile station UE and a core node (CN), a Uu radio bearer is set between the mobile station UE and the relay node RN, a Un radio bearer is set between the relay node RN and the radio base station DeNB, and an S1 bearer is set between the radio base station DeNB and the code node CN.

CITATION LIST

Non-Patent Literature

Non-Patent Literature 1: 3GPP TS36.300 (V8.8.0), "Evolved Universal Terrestrial Radio Access (E-UTRA) and Evolved Universal Terrestrial Radio Access Network (E-UTRAN) Physical Channels", March 2009
Non-Patent Literature 2: 3GPP TR36.814 (V1.0.0), "Further Advancements for E-UTRA Physical Layer Aspects", February 2009
Non-Patent Literature 3: 3GPP TS36.331 (V8.6.0), "Radio Resource Control (RRC); Protocol specification", June 2009
Non-Patent Literature 4: 3GPP TS36.216 (V10.2.0), "Physical layer for relaying operation", March 2011

SUMMARY OF INVENTION

Technical Problem

However, the mobile communication system has a problem that, when a relay node is handed over from a radio base station DeNB#1 to a radio base station DeNB#2, if reception processing (reception processing in a Un radio bearer) of a downlink signal from the radio base station DeNB#2 by the relay node RN and transmission processing (transmission processing in a Uu radio bearer) of a downlink signal to a mobile station UE by the relay node RN are concurrently performed, or reception processing (reception processing in the Uu radio bearer) of an uplink signal from the mobile station UE by the relay node RN and transmission processing (transmission processing in the Un radio bearer) of an uplink signal to the radio base station DeNB#2 by the relay node RN are concurrently performed, a transmitted signal of the relay node RN goes around to an own receiver of the relay node RN, and interference may occur.

Therefore, the present invention has been made in view of the above-described problem, and an objective is to provide a mobile communication method, a relay node, and a radio base station capable of reducing the interference to the own receiver of the relay node RN by the relay node RN due to concurrent transmission/reception processing in the Un radio bearer and in the Uu radio bearer, when the relay node RN is handed over from the radio base station DeNB#1 to the radio base station DeNB#2.

A first characteristic of the present invention is a mobile communication method that includes, in a handover procedure of a relay node from a first radio base station to a second radio base station, a process A of notifying the second radio base station, by the relay node, of a pattern of a first relay node subframe having been used in a radio bearer between the first radio base station and the relay node and setting necessity information indicating whether it is necessary to set a second relay node subframe in a radio bearer between the second radio base station and the relay node by using a connection reconfiguration completion signal.

A second characteristic of the present invention is a relay node that includes a transmission unit configured, in a handover procedure of the relay node from a first radio base station to a second radio base station, to notify the second radio base station of a pattern of a first relay node subframe having been used in a radio bearer between the first radio base station and the relay node and setting necessity information indicating whether it is necessary to set a second relay node subframe in a radio bearer between the second radio base station and the relay node by using a connection reconfiguration completion signal.

A third characteristic of the present invention is a radio base station operating as the first radio base station in a handover procedure of a relay node from a first radio base station to a second radio base station, and including a transition unit configured to notify the second radio base station of a usage rate of a first relay node subframe having been used in a radio bearer between the first radio base station and the relay node.

A fourth characteristic of the present invention is a radio base station operating as the second radio base station in a handover procedure of a relay node from a first radio base station to a second radio base station, and including a reception unit configured to receive, from the relay node, a pattern of a first relay node subframe having been used in a radio bearer between the first radio base station and the relay node and setting necessity information indicating whether it is necessary to set a second relay node subframe in a radio bearer between the second radio base station and the relay node by using a connection reconfiguration completion signal, and to receive, from the first radio base station, a usage rate of the first relay node subframe; and a transmission unit configured, when having determined that it is necessary to set the second relay node subframe based on the setting necessity information, to determine a pattern of the second relay node subframe based on the pattern of the first relay node subframe and the usage rate of the first relay node subframe and to notify the relay node of the pattern of the second relay node subframe.

BRIEF DESCRIPTION OF DRAWINGS

FIG. 3 is a diagram illustrating an example of a format of "RRC Connection Reconfiguration Complete" used in the mobile communication system according to the first embodiment of the present invention.

FIG. 5 is a diagram illustrating an example of a format of "X2 HO Request" used in the mobile communication system according to the first embodiment of the present invention.

FIG. 6 is a diagram illustrating an example of a format of an information element "RN subframe status" included in the "X2 HO Request" used in the mobile communication system according to the first embodiment of the present invention.

FIG. 7 is a diagram illustrating an example of a format of "S1 HO Required" used in the mobile communication system according to the first embodiment of the present invention.

FIG. 8 is a diagram illustrating an example of a format of "S1 HO Request" used in the mobile communication system according to the first embodiment of the present invention.

FIG. 10 is a sequence diagram illustrating an operation of the mobile communication system according to the first embodiment of the present invention.

DESCRIPTION OF EMBODIMENTS (A Configuration of a Mobile Communication System According to a First Embodiment of the Present Invention)

A configuration of a mobile communication system according to a first embodiment of the present invention will be described with reference to FIGS. 1 to 10.

Figure 1:
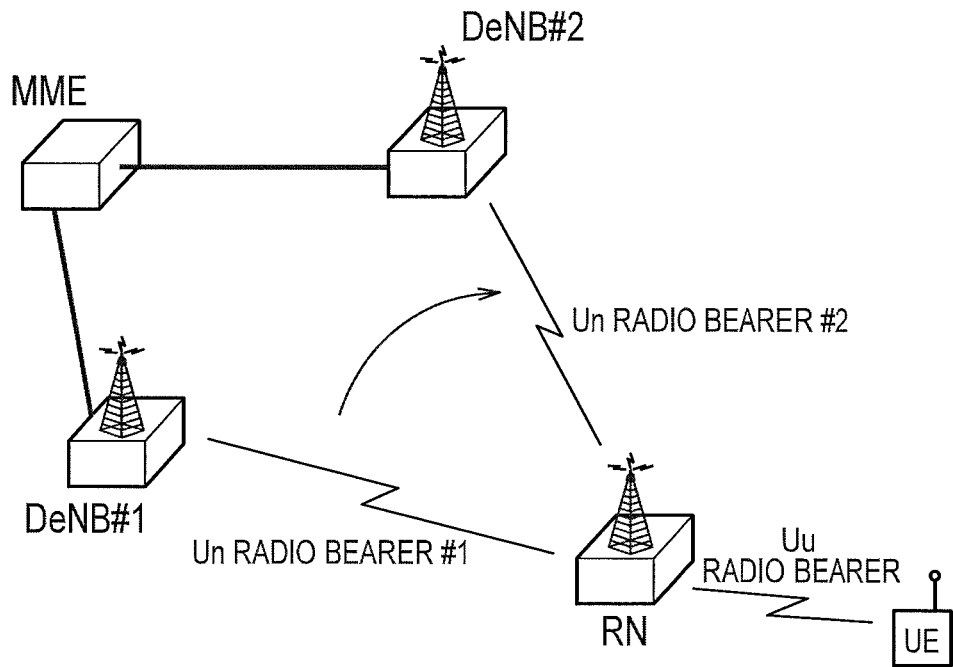
FIG. 1 is an overall configuration diagram of a mobile communication system according to a first embodiment of the present invention.

As illustrated in FIG. 1, a mobile communication system according to the present embodiment is a mobile communication system of an LTE-Advanced system, and includes a mobile management node MME (mobility management entity), a radio base station DeNB#1, a radio base station DeNB#2, a relay node RN, and the like.

Here, in the example of FIG. 1, a Un radio bearer #1 is set between the radio base station DeNB#1 and the relay node RN and a Uu radio bearer is set between the relay node RN and a mobile station UE.

Further, in the present embodiment, an example of a case in which the relay node RN is handed over from the radio base station DeNB#1 to the radio base station DeNB#2 will be described. After the handover procedure is completed, a Un radio bearer #2 is set between the radio base station DeNB#2 and the relay node RN.

Further, the radio base station DeNB#1, the radio base station DeNB#2, and the relay node RN are configured to transmit an uplink signal and a downlink signal by a time division multiplexing.

Further, a "Un subframe #1" is set to the Un radio bearer #1.

Here, the Un subframe #1 is a subframe with which a downlink signal is transmitted from the radio base station DeNB#1 to the relay node RN. That is, the relay node RN transmits a downlink signal to the mobile station UE with a subframe other than the Un subframe #1.

For example, a multicast broadcast single frequency network (MBSFN) subframe may be used as the Un subframe.

Figure 2:
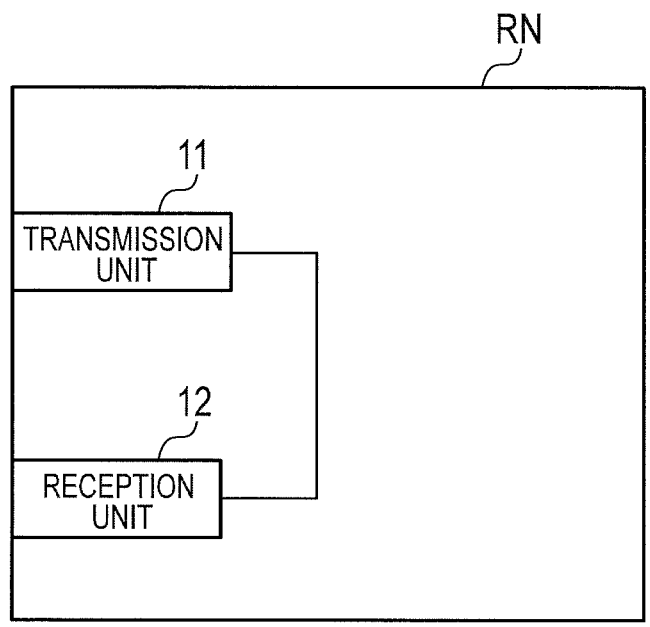
FIG. 2 is a functional block diagram of a relay node RN according to the first embodiment of the present invention.

As illustrated in FIG. 2, the relay node RN includes a transmission unit 11 and a reception unit 12.

The transmission unit 11 is configured to transmit various signals to the radio base stations DeNB#1/DeNB#2 through a Un interface, and to transmit various signals to the mobile stations UE through a Uu interface.

To be specific, the transmission unit 11 is configured to notify the radio base station DeNB#2 of a pattern of the Un subframe #1 and "RN subframe config req" by using "RRC Connection Reconfiguration Complete" in the handover procedure of the relay node RN from the radio base station DeNB#1 to the radio base station DeNB#2.

As illustrated in FIG. 3, the "RRC Connection Reconfiguration Complete" includes an information element "rn-SubframeConfigReq-r11" and an information element "rn-SubframeConfig".

Here, the information element "rn-SubframeConfigReq-r11" in which "required" is set is "RN subframe config req" that indicates it is necessary to set a Un subframe #2 in the Un radio bearer #2, and the information element "rn-SubframeConfigReq-r11" in which "notRequired" is set is "RN subframe config req" that indicates it is not necessary to set the Un subframe #2 in the Un radio bearer #2.

Further, the pattern of the Un subframe #1 is set to the information element "rn-SubframeConfig".

The reception unit 12 is configured to receive various signals from the radio base stations DeNB#1/DeNB#2 through the Un interface, and to receive various signals from the mobile station UE through the Uu interface.

Figure 4:
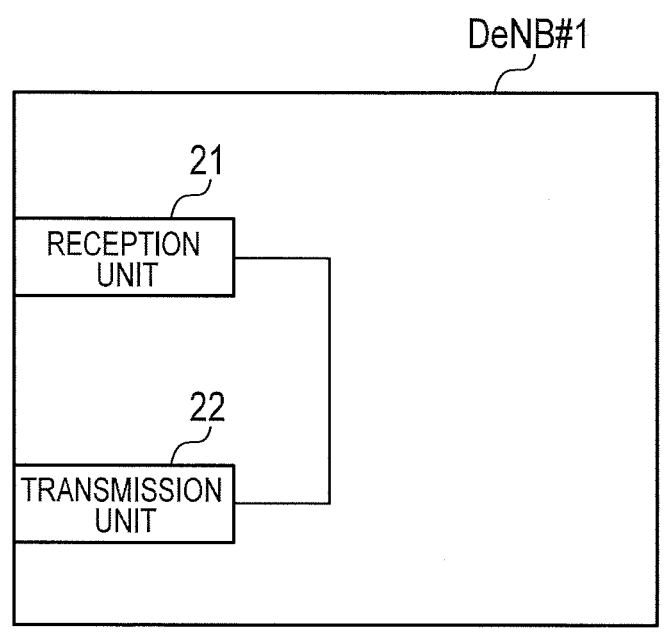
FIG. 4 is a functional block diagram of a radio base station DeNB#1 according to the first embodiment of the present invention.

As illustrated in FIG. 4, the radio base station DeNB#1 includes a reception unit 21 and a transmission unit 22.

The reception unit 21 is configured to receive various signals from the relay node RN through the Un interface, and to receive various signals from the mobile station UE through the Uu interface.

The transmission unit 22 is configured to transmit various signals to the relay node RN through the Un interface, and to transmit various signals to the mobile station UE through the Uu interface.

Here, the transmission unit 22 is configured to notify the radio base station DeNB#2 of a usage rate of the Un subframe #1 in the handover procedure of the relay node RN from the radio base station DeNB#1 to the radio base station DeNB#2.

For example, the transmission unit 22 may be configured to notify the radio base station DeNB#2 of the usage rate of the Un subframe #1 by using "(X2/S1) HO Request/(S1) HO Required" in the handover procedure of the relay node RN from the radio base station DeNB#1 to the radio base station DeNB#2.

As illustrated in FIG. 5, "(X2) HO Request" includes an information element "RN Subframe status".

As illustrated in FIG. 6, the usage rate of the Un subframe #1 can be set in the information element "RN Subframe status".

Note that the "(X2) HO Request" may include an information element "RN Subframe Configuration" that indicates the pattern of the Un subframe #1.

Similarly, as illustrated in FIGS. 7 and 8, "(S1) HO Required" and "(S1) HO Request" include the information element "RN Subframe status".

Note that the "(S1) HO Required" and the "(S1) HO Request" may also include the information element "RN Subframe Configuration" that indicates the pattern of the Un subframe #1.

Figure 9:
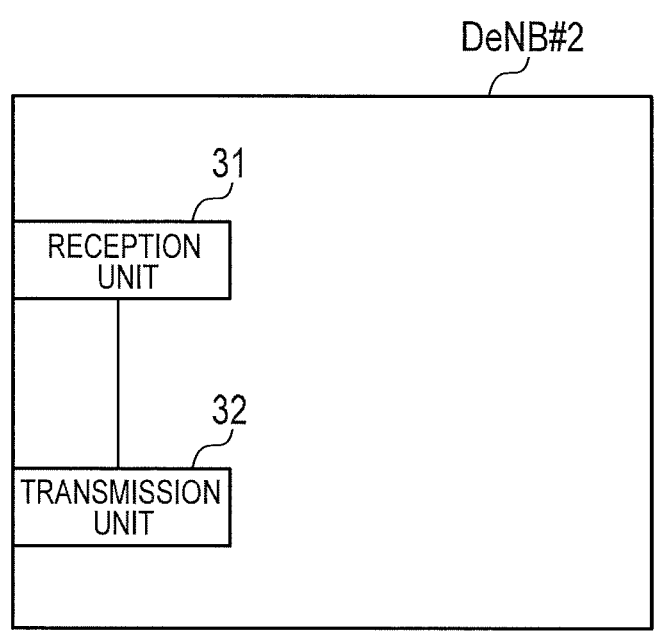
FIG. 9 is a functional block diagram of a radio base station DeNB#2 according to the first embodiment of the present invention.

As illustrated in FIG. 9, the radio base station DeNB#2 includes a reception unit 31 and a transmission unit 32.

The reception unit 31 is configured to receive various signals from the relay node RN through the Un interface, and to receive various signals from the mobile station UE through the Uu interface.

Here, the reception unit 31 is configured to receive the pattern of the Un subframe #1 and the "RN subframe config req" by using the "RRC Connection Reconfiguration Complete" from the relay node RN in the handover procedure of the relay node RN from the radio base station DeNB#1 to the radio base station DeNB#2.

In addition, the reception unit 31 is configured to receive the usage rate of the Un subframe #1 from the radio base station DeNB#2 in the handover procedure of the relay node RN from the radio base station DeNB#1 to the radio base station DeNB#2.

The transmission unit 32 is configured to transit various signals to the relay node RN through the Un interface, and to transmit various signals to the mobile station UE through the Uu interface.

Here, in the handover procedure of the relay node RN from the radio base station DeNB#1 to the radio base station DeNB#2, the transmission unit 32 is configured, when having determined that it is necessary to set the Un subframe #2 based on the "RN subframe config req", to determine a pattern of the Un subframe #2 (for example, including the number of Un subframes) based on the pattern of the Un subframe #1 and the usage rate of the Un subframe #1, and to notify the relay node RN of the pattern of the Un subframe #2.

(An Operation of the Mobile Communication System According to the First Embodiment of the Present Invention)

An operation of the mobile communication system according to the first embodiment of the present invention will be described with reference to FIG. 10.

To be specific, an operation of a case in which the relay node RN is handed over from the radio base station DeNB#1 to the radio base station DeNB#2 in the mobile communication system according to the first embodiment of the present invention will be described with reference to FIG. 10.

As illustrated in FIG. 4, in step S1001, the relay node RN transmits "Measurement Report" to the radio base station DeNB#l.

In step S1002, when having determined that it is necessary to implement the above-described handover, the radio base station DeNB#1 transmits, to the radio base station DeNB#2, "(S1/X2) HO Request/(S1) HO Required" for requesting implementation of the handover.

Here, the radio base station DeNB#1 notifies the radio base station DeNB#2 of the usage rate of the Un subframe #1 by using the "(S1/X2) HO Request/(S1) HO Required".

In step S1003, the radio base station DeNB#2 transmits "(S1/X2) HO Request ACK" to the radio base station DeNB#1 according to the received "(S1/X2) HO Request".

In step S1004, the radio base station DeNB#1 transmits "RRC Connection Reconfiguration" including "mobility-ControlInfo" to the relay node RN according to the received "(S1/X2) HO Request ACK".

In step S1005, the relay node RN is detached from the radio base station DeNB#1, establishes SFN synchronization with the radio base station DeNB#2, and starts communication with the radio base station DeNB#2.

In step S1006, the relay node RN transmits the "RRC Connection Reconfiguration Complete" to the radio base station DeNB#2.

Here, the relay node RN is configured to notify the radio base station DeNB#2 of the pattern of the Un subframe #1 and the "RN subframe config req" by using the "RRC Connection Reconfiguration Complete".

Here, when having determined that it is necessary to set the Un subframe #2 of the Un radio bearer #2 based on the "RN subframe config req", the radio base station DeNB#2 determines the pattern of the Un subframe #2 based on the usage rate of the Un subframe #1 notified from the radio base station DeNB#1 and the pattern of the Un subframe #1 notified from the relay node RN.

In step S1007, the radio base station DeNB#2 notifies the relay node RN of the pattern of the Un subframe #2 by using "RN Reconfiguration".

In step S1008, the relay node RN transmits "RN Reconfiguration Complete" to the radio base station DeNB#2.

(Functions and Effects of the Mobile Communication System According to the First Embodiment of the Present Invention)

According to the mobile communication system according to the first embodiment of the present invention, in the process in which the relay node RN is handed over from the radio base station DeNB#1 to the radio base station DeNB#2, when having determined that it is necessary to set the Un subframe #2 in the Un radio bearer #2 based on the "RN subframe config req", the radio base station DeNB#2 can determine the pattern of the Un subframe #2 based on the usage rate of the Un subframe #1 notified from the radio base station DeNB#1 and the pattern of the Un subframe #1 notified from the relay node RN, and notify the pattern of the Un subframe #2 to the relay node RN.

As a result, even when the handover is carried out, concurrent transmission/reception processing in the Un radio bearer and in the Uu radio bearer in the relay node RN can be avoided.

The characteristics of the present embodiments described above may be expressed as follows.

A first characteristic of the present embodiment is a mobile communication method, which includes, in a handover procedure of a relay node RN from a radio base station DeNB#1 (first radio base station) to a radio base station DeNB#2 (second radio base station), notifying the radio base station DeNB#2, by the relay node RN, of a "Un subframe pattern #1" that indicates a pattern of a Un subframe #1 (first relay node subframe) having been used in a Un radio bearer #1 between the radio base station DeNB#1 and the relay node RN, and "RN subframe config req (setting necessity information)" that indicates whether it is necessary to set a Un subframe #2 (second relay node subframe) in a Un radio bearer #2 between the radio base station DeNB#2 and the relay node RN, by using "RRC Connection Reconfiguration Complete (connection reconfiguration completion signal)".

The first characteristic of the present embodiment may further include, in the handover procedure, a process B of notifying a usage rate of the Un subframe #1 to the radio base station DeNB#2 by the radio base station DeNB#1.

In the first characteristic of the present embodiment, the radio base station DeNB#1 may notify the radio base station DeNB#2 of the usage rate of the Un subframe #1 by using "HO Request/HO Required (handover request signal)" in the process B.

The first characteristic of the present embodiment may further include a process C of determining, by the radio base station DeNB#2, a pattern of a Un subframe #2 based on the pattern of the Un subframe #1 and the usage rate of the Un subframe #1 in the handover procedure.

A second characteristic of the present embodiment is a relay node RN, which includes, in a handover procedure of the relay node RN from a radio base station DeNB#1 to a radio base station DeNB#2, a transmission unit 11 configured to notify the radio base station DeNB#2 of the pattern of the Un subframe #1 and "RN subframe config req" by using "RRC Connection Reconfiguration Complete".

A third characteristic of the present embodiment is a radio base station DeNB#1, which includes a transmission unit 22 configured to notify a radio base station DeNB#2 of a usage rate of a Un subframe #1.

In the third characteristic of the present embodiment, the transmission unit 22 maybe configured to notify the radio base station DeNB#2 of the usage rate of the Un subframe #1 by using the "HO Request/HO Required".

A fourth characteristic of the present embodiment is a radio base station DeNB#2 which includes a reception unit 31 configured to receive a pattern of a Un subframe #1 and "RN subframe config req" from a relay node RN by using "RRC Connection Reconfiguration Complete", and to receive a usage rate of the Un subframe #1 from the radio base station DeNB#2, and a transmission unit 32 configured, when having determined that it is necessary to set a Un subframe #2 based on the "RN subframe config req", to determine a pattern of the Un subframe #2 based on the pattern of the Un subframe #1 and the usage rate of the Un subframe #1, and to notify the relay node RN of the pattern of the Un subframe #2.

Note that the above-described operations of the radio base stations DeNB#1/DeNB#2, the relay node RN, the mobile management node MME, and the mobile station UE may be implemented by hardware, by a software module executed by a processor, or by combination of the hardware and the software module.

The software module may be provided in an arbitrary-format storage medium such as a random access memory (RAM), a flash memory, a read only memory (ROM), an erasable programmable ROM (EPROM), an electrically erasable and programmable ROM (EEPROM), a register, a hard disk, a removable disk, or a CD-ROM.

The storage medium is connected to the processor so that the processor can read/write information in the storage medium. In addition, the storage medium may be integrated in the processor. In addition, the storage medium and the processor may be provided in the ASIC. The ASIC may be provided in the radio base stations DeNB#1/DeNB#2, the relay node RN, the mobile management node MME, or the mobile station UE. In addition, the storage medium and the processor may be provided in the radio base stations DeNB#1/DeNB#2, the relay node RN, the mobile management node MME, or the mobile station UE.

While the present invention has been described in details using the embodiments, it is apparent for a person skilled in the art that the present invention is not limited to the embodiments described in the present specification. The present invention can be implemented under a modification or an alternation without departing from the gist and scope of the present invention defined by the description of claims. Therefore, the description of the present specification is given for illustrative purposes only, and does not provide any restrictive meaning to the present invention.

Note that the entire contents of Japanese Patent Application No. 2011-122199 (filed on May 31, 2011) are incorporated in the specification of the present application by reference.

INDUSTRIAL APPLICABILITY

As described above, according to the present invention, when a relay node RN is handed over from a radio base station DeNB#1 to a radio base station DeNB#2, a mobile communication method, a relay node, and a radio base station capable of reducing the interference to an own receiver of the relay node RN by the relay node RN due to concurrent transmission/reception processing in a Un radio bearer and in a Uu radio bearer can be provided.

REFERENCE SIGNS LIST

RN Relay node
DeNB#1 and DeNB#2 Radio base station
11, 22, and 32 Transmission unit
12, 21, and 31 Reception unit

The invention claimed is:

1. A mobile communication method, in a handover procedure of a relay node from a first radio base station to a second radio base station, the mobile communication method comprising:
notifying the second radio base station, with the relay node, of a pattern of a first relay node subframe and setting necessity information using a connection reconfiguration completion signal, wherein
the pattern of the first relay node subframe has been used in a radio bearer between the first radio base station and the relay node, and
the setting necessity information indicates whether it is necessary to set a second relay node subframe in a radio bearer between the second radio base station and the relay node.

2. The mobile communication method according to claim 1, further comprising notifying the second radio base station, with the first radio base station, of a usage rate of the first relay node subframe.

3. The mobile communication method according to claim 2, wherein the first radio base station notifies the second radio base station of the usage rate using a handover request signal.

4. The mobile communication method according to claim 2, further comprising determining, with the second radio base station, a pattern of the second relay node subframe based on the pattern of the first relay node subframe and the usage rate.

5. A relay node comprising:
a transmission unit that notifies, in a handover procedure of the relay node from a first radio base station to a second radio base station, the second radio base station of a pattern of a first relay node subframe and the relay node and setting necessity information using a connection reconfiguration completion signal, wherein
the pattern of the first relay node subframe has been used in a radio bearer between the first radio base station and the relay node, and
the setting necessity information indicates whether it is necessary to set a second relay node subframe in a radio bearer between the second radio base station and the relay node.

6. A radio base station configured, in a handover procedure of a relay node from a first radio base station to a second radio base station, to operate as the second radio base station, and comprising:
a reception unit that receives,
from the relay node, a pattern of a first relay node subframe having been used in a radio bearer between the first radio base station and the relay node and setting necessity information indicating whether it is necessary to set a second relay node subframe in a radio bearer between the second radio base station and the relay node by using a connection reconfiguration completion signal, and
from the first radio base station, a usage rate of the first relay node subframe; and
a transmission unit
that determines a pattern of the second relay node subframe based on the pattern of the first relay node subframe and the usage rate when having determined that it is necessary to set the second relay node subframe based on the setting necessity information, and that notifies the relay node of the determined pattern of the second relay node subframe.

* * * * *